United States Patent
Manwiller

(10) Patent No.: US 9,333,789 B2
(45) Date of Patent: *May 10, 2016

(54) DECAL PRINTING PAPER FOR CERAMICS

(71) Applicant: Enduring Images, Inc., Golden, CO (US)

(72) Inventor: Ronald Manwiller, Evergreen, CO (US)

(73) Assignee: Enduring Images, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,153

(22) Filed: May 6, 2015

(65) Prior Publication Data

US 2016/0039236 A1   Feb. 11, 2016

Related U.S. Application Data

(60) Provisional application No. 62/035,953, filed on Aug. 11, 2014.

(51) Int. Cl.
| | |
|---|---|
| G03G 15/00 | (2006.01) |
| B41M 5/382 | (2006.01) |
| B41F 15/00 | (2006.01) |
| B41M 5/26 | (2006.01) |
| G03G 7/00 | (2006.01) |
| B41M 5/00 | (2006.01) |
| C04B 41/81 | (2006.01) |
| B44C 1/175 | (2006.01) |
| C04B 41/45 | (2006.01) |

(Continued)

(52) U.S. Cl.
CPC ............ *B41M 5/38214* (2013.01); *B41F 15/00* (2013.01); *B41M 1/34* (2013.01); *B41M 5/007* (2013.01); *B41M 5/262* (2013.01); *B44C 1/175* (2013.01); *C04B 41/4511* (2013.01); *C04B 41/81* (2013.01); *G03G 7/0093* (2013.01); *G03G 15/1625* (2013.01)

(58) Field of Classification Search
CPC .... B44C 1/1704; B44C 1/1708; B44C 1/175; B44C 1/1712; C04B 41/4511; C04B 41/4501; C04B 41/81; C04B 41/85; C04B 41/89; C04B 33/00; G03G 15/1625; G03G 7/0093; B41M 3/12; B41M 1/34; B41M 5/007
See application file for complete search history.

(56) References Cited

U.S. PATENT DOCUMENTS

| | | | | |
|---|---|---|---|---|
| 5,132,165 | A | * | 7/1992 | Blanco ........................ 428/210 |
| 5,273,575 | A | * | 12/1993 | de Saint Romain ....... 106/31.05 |

(Continued)

FOREIGN PATENT DOCUMENTS

EP     2189850 A1    5/2010

OTHER PUBLICATIONS

"The Effect of Zirconium Oxide in Glasses, Glazes, and Enamels" by C.J. Kinzie and C.H. Commons published in Feb. 1934.*

*Primary Examiner* — Blake A Tankersley
(74) *Attorney, Agent, or Firm* — Dorr, Carson & Birney PC

(57) ABSTRACT

A decal printing paper for ceramic surfaces has a base paper coated with a water-soluble release layer, an image transfer layer made of liquid cover coat with glass/ceramic flux added, and a printed image layer. The glass/ceramic flux contains glass frit with a relatively low melting point to provide a one-step printing paper with a glass/ceramic flux that delivers the required adhesion, as well as reducing the firing temperature. The image transfer layer can also include a dye colorant to provide a visual indication of a functional characteristic of the decal printing paper.

8 Claims, 2 Drawing Sheets

(51) Int. Cl.
   *G03G 15/16*   (2006.01)
   *B41M 1/34*    (2006.01)

(56) References Cited

U.S. PATENT DOCUMENTS

| | | | |
|---|---|---|---|
| 5,948,471 A | 9/1999 | Zimmer | |
| 6,068,692 A | 5/2000 | Zimmer | |
| 6,110,632 A * | 8/2000 | Dunford et al. | 430/108.6 |
| 6,149,747 A * | 11/2000 | Lorenz et al. | 156/89.11 |
| 6,694,885 B2 | 2/2004 | Geddes et al. | |
| 7,622,237 B2 | 11/2009 | Banhazl | |
| 8,308,890 B2 | 11/2012 | Koops et al. | |
| 2003/0013027 A1 | 1/2003 | Wallace | |
| 2004/0170458 A1 | 9/2004 | Carbone | |

* cited by examiner

DECAL PRINTING PAPER FOR CERAMICS

RELATED APPLICATION

The present application is based on and claims priority to the Applicant's U.S. Provisional Patent Application 62/035,953, entitled "Decal Printing Paper for Ceramics," filed on Aug. 11, 2014.

BACKGROUND OF THE INVENTION

1. Field of the Invention

The present invention relates generally to the field of decal printing paper for ceramic surfaces. More specifically, the present invention discloses new decal printing paper designs, compositions and methods for transferring high resolution (up to 1200 by 1200 pixels per inch resolution) single- or multi-color images onto the matte, glossy, glazed or unglazed surface of inorganic (various forms of ceramic, porcelain, porcelain enamel, glass or metal) substrates and permanently affixing them to said substrate by heating in a kiln. The printing papers are useful in many of the currently available commercial laser printers that use inorganic toner formulations such as iron oxide, ceramic pigment and MICR toner.

2. Background of the Invention

Decals have been used for many years to transfer pre-printed designs to a substrate, such a ceramic object. A decal is typically a multi-layer construction with four layers as shown for example in FIG. 1. One layer is a base paper 10 that is the coated with a water-soluble release layer 12, often comprised of gum arabic. This two-layer paper is referred to as waterslide decal paper, waterslide paper, or just decal paper. It is widely used as the printing paper in digital decal printing devices and other printing methods such as screen printing for the production of waterside decals. Such waterslide decal papers are commercially available from a number of companies such a Tulliss-Russell Coaters.

Another layer 14 is the image transfer layer made of liquid ceramic cover coat. This material can be screen printed onto the decal paper or sprayed. This liquid material is commercially supplied by MZ Toner Technologies and others. Once the liquid layer dries, the paper is ready to be placed into a printer that prints the image 16. This image transfer layer material maintains the integrity of the printed image after the decal is immersed in water, releaser from the waterslide paper and transferred to the substrate being decorated.

An image transfer layer that includes additives in the coated transfer material has been developed and demonstrated by Zimmer in U.S. Pat. No. 6,068,692 to enhance the functionality and usefulness of printed ceramic decorations (decals). This approach is useful with laser printers using toners with inorganic materials such as ceramic pigments, iron oxide and MICR laser printer toner formulations. But this system requires that the image transfer layer must be applied to the decal in a secondary processing step that uses a thermal pouch laminator to bond the image transfer layer to the printed decal paper or liquid application via screen printing or aerosol spray.

Applying transfer material directly onto the waterslide paper and printing onto the image transfer layer directly by laser printing devices enables the one step production of a decal that is ready to use as a standard waterslide decoration. Papers of this basic design are commercially available but none of them include additives in the image transfer layer material that can enhance the performance and expand the usefulness of the one step printed decal.

The present applicant is unaware of any system of decal printing papers that encompasses all of the advantages of the present invention, including: (1) The ability to decorate a wide variety of substrates including those with matte, glossy, glazed and unglazed surfaces; (2) Single step printed decal production; (3) Food safety due to flux additives with low lead content in the transfer material; (4) Providing a means for identifying the functionalities of different image transfer materials by adding different dye colorants to the image transfer materials; (5) Expand the useful firing temperature range to as low as 1150° F. to achieve a wider color spectrum in the finished decoration; and (6) Additional background color or white background in the image transfer layer.

Several other methods for permanently affixing kiln-fired images onto ceramic surfaces have been patented (e.g., Geddes, U.S. Pat. No. 6,694,885 and Banhazl, U.S. Pat. No. 7,622,237 and others) but none use a simple one-step printed transfer paper that carries with it a glass frit/flux that expands the usefulness and performance of the paper as described in the present invention. The printed waterslide decal (transfer) papers described herein are unique in their ability to enable the expanded usefulness of decal decorations within a one-step, easy to use, inexpensive print and apply decal transfer print paper. In addition, the flexibility exists within the design of these transfer papers to print and apply either positive or inverted images to glossy, matte, glazed and unglazed surfaces to achieve a wide variety of decorating results and decal usefulness. Using this decal printing paper with a glass flux in the image transfer layer material, it is also possible to add secondary or tertiary film layers or other additives to further expand the functionality of the decals produced. Finally, the manufactures of the most widely used black-and-white laser printers that rely on an iron oxide black toner have begun to replace those toners with more industry standard organic printing toners that will not survive ceramic or glass firing temperatures in a kiln. This may render single-step papers without a glass flux in the image transfer layer, such as the Banhazl system, mostly obsolete.

Currently available single-step waterslide decal printing papers for producing decals with inorganic iron oxide printing toners carry no glass flux in the image transfer layer. For the inorganic material to adhere to the substrate, it must be applied on a glossy surface to be decorated and fired at temperatures high enough to soften the glaze or melt the iron oxide on the decorated surface. This is often higher than 1800° F. and may be as high as 2200° F. for some commercial items like ceramic floor tile. With the addition of a glass (frit) flux mixed into the image transfer layer material, we have demonstrated that this firing temperature can be reduced to as low as 1150° F. for a low melt point glass flux, and up to 1750° F. for a higher melt point flux in the image transfer layer material. Lower firing temperatures may be possible with the addition of a glass flux with a still lower melt point. This expanded (lower) firing temperature range improves energy efficiency by reducing the power consumption and duration of the firing process while still achieving sufficient image adhesion for the decorated item to be useful in commercial and artistic end uses on ceramic, glass and metal substrates.

In addition, heating the black iron oxide pigment ($Fe_3O_4$ magnetite) in the presence of oxygen converts the magnetite to hematite ($Fe_2O_3$) or more commonly known as rust. At the very high temperatures required by other one step papers, the black iron oxide pigment is fully converted to $Fe_2O_3$ and fully converts the black pigment into an orange or sepia pigment. Firing to the lower temperatures possible with these new papers preserves at least some of the original black color enabling the creation of a dark chocolate brown image. So, having flux additives in the image transfer material with specified melt points such as the ones used in these papers enables a range of colors in the fired decoration.

Furthermore, the addition of glass flux in the image transfer layer material expands the usefulness of these printing papers to enable decoration of artistic substrates that are matte or unglazed and no longer requires a glossy or glazed surface. Finally, incorporating an organic dye in the image transfer material allows the user to quickly differentiate the functionality of one paper from the others. No special equipment is needed and no exposure to hazardous materials is required. This firing temperature flexibility and economy has not been possible before in a one-step printed decal without the glass flux additive described herein. The efficiency of a one-step transfer of the printed image on a film layer that incorporates glass flux is novel. Additional functionality can result and have been demonstrated by using different types of glass flux, such as a low lead oxide glass that can result in a food safe decoration. Other types of additives may be useful, such as white or colored ceramic pigments, and are under development, to further expand the usefulness and design flexibility of the present one-step printed decal.

The present invention provides a set of decal printing papers that use a standard waterslide decal paper and are then coated with a transfer material that incorporates a glass flux. The addition of the glass flux in the transfer material expands the usefulness of this one-step printing paper design. This design of the decal printing paper enables a finished decal to be produced by direct printing in one step in any of a variety of commercial laser printers, in single color or four color. The flux in the image transfer layer enables a variety of performance advantages and enhancements beyond those that are currently available. Color coding the different papers with a color dye in the image transfer material simplifies the task of identifying which paper is most useful for a particular decorating objective.

The concept of printing an image transfer layer onto waterslide decal paper to enable the one-step printing of a ceramic decal is not novel (as shown for example by Banhazl). But, adding flux to that image transfer layer material is novel and expands the usefulness of the printed decal as disclosed in the present invention. The glass flux enables the creation of a ceramic decal that can be used in four-color digital ceramic laser printers such as those used in the Zimmer system, conventional monochrome (black and white) laser printers such as the H-P and Canon laser printers that use iron oxide and other inorganic materials in the black toner formulation and also for creating ceramic decals using laser printers that use machine readable MICR toner. The glass flux added to the image transfer layer material expands the variety of substrates that can be decorated to include glossy, matte, glazed and unglazed surfaces, glass and porcelain enameled surfaces. It also reduces the required firing temperature down to the range of about 1150° F.-1750° F. for low melt point glass flux. With a low lead oxide containing flux in the coated material layer, papers of this design can give the final decorations food-safe properties. The printed image transfer layer material may also be used to carry white and other color ceramic pigment as background layers in the decal, and can include a dye to differentiate one functionality from the others.

In the Zimmer ceramic printing system, this image transfer layer material is coated onto to a donor paper and applied on top of the image that was printed directly onto the waterslide decal paper. The application is performed in a secondary process step wherein the transfer film/donor paper is placed onto the printed waterslide paper and heated in a pouch laminator. This heating step releases the image transfer layer from the donor paper and attaches it to the top of the printed waterslide paper. In this format, the decal has the transfer film applied on top of the printed image. In the Zimmer system, these image transfer layers have glass flux but require this secondary processing step of lamination (or screen and aerosol application of the liquid transfer material) to produce a finished decal.

An alternative to this approach uses a waterslide decal paper that has been coated with a transfer material directly onto the waterslide decal paper (such as disclosed by Banhazl). This is then fed into the printer so that the ceramic image is printed on top of the image transfer layer. This approach has the advantage of being a one step process for the creation of a decal but none of these papers are available with flux and so their usefulness is constrained.

By using the present invention, the best features of both of these systems are captured while avoiding potential disadvantages such as: limitations on the substrates that can be decorated; requiring high firing temperatures; avoiding any effect of the obsolescence of iron oxide toner in commercial black-and-white printers like those sold by H-P and Canon; and other constraints on the nature of the decoration such as food safety.

For example, consider a ceramic artist who has been using a currently available single-step paper to transfer iron oxide images onto glossy surfaces. Assume the artist now wants to improve efficiency by firing to a much lower temperature than the temperature required by iron oxide black toner and also wants to decorate an unglazed tile that does not have a glossy surface. Also assume the artist desires to achieve a brown color instead of sepia. This is not possible with currently available one-step papers because at low temperatures there is no bonding mechanism for the iron oxide that forms the image. If fired at low temperatures onto an unglazed, non-glossy surface, the iron oxide would simply wipe off the surface. In contrast, the present invention provides a one-step printing paper with a ceramic flux added to the image transfer layer that delivers the required color and adhesion at low temperatures, as well as reducing the firing temperature thus saving energy expense.

In addition, the iron oxide toner used in many laser printers can change oxidation state during the subsequent firing process, and change from black to orange. This occurs due to the very high temperatures (1800° F.+) required to encapsulate the iron oxide pigment into the glossy surface of the decorated part. Many artists dislike this color. The present invention uses a flux with a low melting point in the release layer that significantly reduces the firing temperatures and thereby preserves a near black results to provide a much more aesthetically desirable result.

SUMMARY OF THE INVENTION

This invention provides decal printing paper for ceramic surfaces having a base paper coated with a water-soluble release layer, an image transfer layer of liquid cover coat with glass/ceramic flux added, and a printed image layer. The glass/ceramic flux contains glass frit with a relatively low melting point. The image transfer layer can also include other functional additives, such as a color dye to a visual indication of a functional characteristic (e.g., melting point or a specific functional additive) of the decal printing paper.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
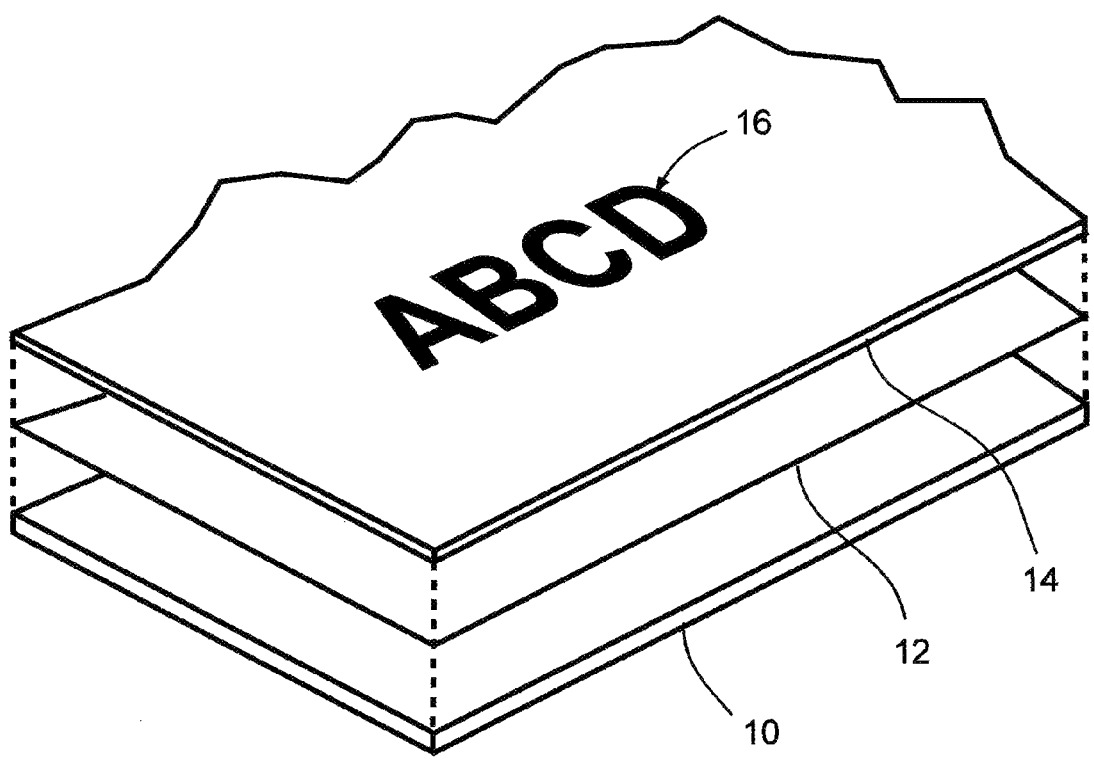
FIG. 1 is an exploded cross-sectional diagram of a decal printing paper.

The present invention employs a decal printing paper for ceramic surfaces having multiple layers as generally shown in FIG. 1 with a base paper 10 coated with a water-soluble release layer 12, an image transfer layer 14 of liquid cover coat with glass/ceramic flux added, and a printed image layer 16. The glass/ceramic flux contains glass frit with a relatively low melting point.

For example of the image transfer layer material 14 can be created using the standard "flux" cover coat commercially available from MZ Toner Technologies. Similar materials are available from others, such as Heraeous, and may also be useful although they have not been tested. Using the MZ Toner Technologies flux transfer material, a lead oxide containing glass frit/flux in a concentration of 12.5% to 20%, plus 3% to 5% cadmium silicate (optional) in a petroleum solvent making up the remaining 50% to 75% is coated onto the decal paper and allowed to dry. For example, the petroleum solvent can include naphtha, trimethylbenzene, propylbenzene or similar compounds. The glass frit in the glass/ceramic flux has a low melting point, preferably about 1150° F. to 1750° F. Different flux materials could be used to extend this range. The artist would use this paper to print the desired image 16 directly onto this image transfer layer 14 to complete the decal. Future additive options may include additional pigments in the image transfer layer 14 and other functional additives that give new features to the print paper. For example, ceramic pigments can be included in the image transfer layer 14 to create a desired background color.

Figure 2:
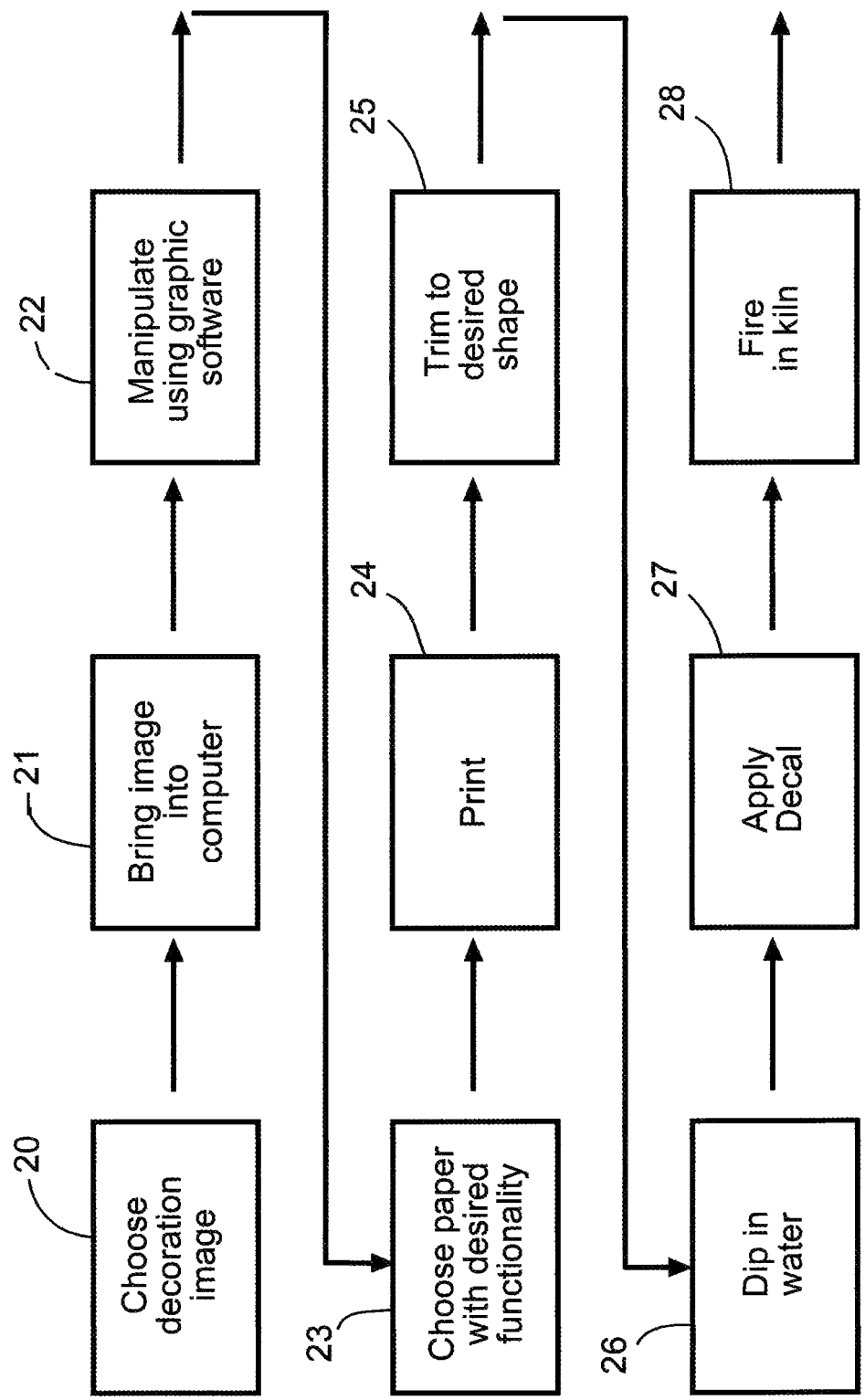
FIG. 2 is a flowchart illustrating a method of use of the present invention.

FIG. 2 is a flowchart illustrating the steps in using the present invention. First, the ceramicist would choose an item they wish to decorate, for example an unglazed or matte tile. They will then select the image for decoration (step 20), and this image is opened in the computer (step 21). If desired, the image can be manipulated using an image software, such as Adobe Photoshop 5 (step 22). The artist then selects an appropriate printer paper, such as those described herein, with a suitable low-temperature melt point frit (step 23). The artist puts this paper in the printer and sends the print job to the printer. The image is then printed, using any of the commercially-available inorganic pigment toners, onto the one-step paper with the required additive in the image transfer layer material (step 24). This creates the finished printed decal in one step. This printed decal can be trimmed if desired (step 25), and can then be immersed in water to release the image transfer layer material 14 with the chosen additive(s) and the printed image layer 16 from the base paper 10 (step 26). This decoration is then applied onto the unglazed (matte) surface of the item being decorated (step 27). Finally, the decoration is permanently bonded to the substrate by subsequent heating in a kiln (step 28). Depending on the melt point of the flux or pigment additive chosen, this can be as low as 1150° F. During heating, the organic materials in the image transfer layer will oxidize (mostly to carbon dioxide and water vapor) and will be fully oxidized by a temperature of around 900° F. Some amount of evaporation of these organic materials will also occur during the heating process. After the organic materials are removed through evaporation and oxidation, all that remains of the applied decoration are the inorganic materials—iron oxide, ceramic pigment or MICR—that were printed and the flux or other additives that were part of the image transfer layer material. As the temperature rises beyond 1000° F. to a temperature above the melt point of the flux, the flux material will melt and bond to the unglazed surface also permanently adhering the printed image to the surface. In other words, in the preferred embodiment of the present invention, the ceramic object is heated to a temperature of about 1150° F. to 1750° F., depending the melting point of the glass frit. In this way the artist saves energy, time and money and creates a unique decoration with a broader choice of finished color on an unglazed handmade tile.

The sequence of some of these steps may be changed. If the artist wishes to explore inverting the image and reversing the transfer this is possible. Applying the decoration in an inverted orientation places the glass flux in the image transfer layer material on top of the printed image instead of underneath of it. Both are acceptable options but give slightly different results, which may be desirable in some applications.

This process for creating a ceramic decal is useful with printers that use iron oxide, multi-color ceramic, and MICR toners. In this way the required firing temperature may be as low as 1150° F. saving time and energy, may enable decorations that meet the food safety requirements of the FDA and California Proposition 65 (assuming the decorated substrates meet these standards), allow one step printed decals to decorate matte and unglazed surfaces as well as glazed and glossy surfaces and in the future may incorporate a color layer as well as additional additives to further enhance the functionality of the decal. Current single-step decal printing papers cannot achieve this.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A decal printing paper for transferring an image to a ceramic surface comprising:
   a base paper;
   a water-soluble release layer coating the base paper;
   an image transfer layer made from liquid cover coat, an organic dye colorant providing a visual indication of a functional characteristic of the decal printing paper, and glass/ceramic flux, said glass/ceramic flux containing glass frit with a melting paint of about 1150° to 1750° F.; and
   a printed image layer containing a printed image.

2. The decal printing paper of claim 1 wherein the printed image is printed on the printed image layer of the printing paper with inorganic pigments toners.

3. The decal printing paper of claim 1 wherein the glass frit comprises low lead oxide glass.

4. The decal printing paper of claim 1 wherein the image transfer layer further comprises a ceramic pigment.

5. The decal printing paper of claim 1 wherein the image transfer layer is on top of the water-soluble release layer, and the printed image layer is on top of the image transfer layer.

6. A decal printing paper for transferring an image to a ceramic surface comprising:
a base paper;
a water-soluble release layer coating the base paper; and
an image transfer layer made from liquid cover coat, an organic dye colorant providing a visual indication of a functional characteristic of the decal printing paper, and glass/ceramic flux for receiving a printed image layer containing a printed image, said glass ceramic flux containing glass frit with a melting point of about 1150° to 1750° F.

7. The decal printing paper of claim 6 wherein the glass frit comprises low lead oxide glass.

8. The decal printing paper of claim 6 wherein the image transfer layer further comprises a ceramic pigment.

* * * * *